Dec. 22, 1970    J. E. THOMAS    3,550,019

LINEARIZING CIRCUIT FOR NET OIL ANALYZERS

Filed Nov. 17, 1967

INVENTOR
JOSEPH E. THOMAS

BY
Burns, Doane, Benedict, Swecker + Mathis
ATTORNEYS

United States Patent Office 3,550,019
Patented Dec. 22, 1970

3,550,019
LINEARIZING CIRCUIT FOR NET OIL ANALYZERS
Joseph E. Thomas, Duncan, Okla., assignor to Halliburton Company, Duncan, Okla., a corporation of Delaware
Filed Nov. 17, 1967, Ser. No. 684,042
Int. Cl. H03b 3/04
U.S. Cl. 328—140                                   9 Claims

ABSTRACT OF THE DISCLOSURE

A tuned circuit between a digital transducer having an electrical signal output, the frequency of which is responsive to a variable physical condition, and an integrating capacitor which indicates the average pulse rate, the tuned circuit being used to compensate for nonlinearity of the frequency response of the transducer to the condition sensed.

BACKGROUND OF THE INVENTION

Heretofore a troublesome problem has existed in the adaptation of a condition responsive transducer to various control devices. This problem is the nonlinearity of the frequency response of the transducer to the condition being sensed.

In conventional systems of this type, the output pulses of the transducer are rectified and integrated by means of a capacitor, the charge accumulating on the capacitor being representative of the response of the transducer and thus the condition sensed. Unfortunately, any nonlinearity which exists between the output frequency of the transducer and the condition sensed is thus reflected in the charge on the capacitor. Prior efforts to remedy this problem have been to modify the transducer frequency response and/or to use capacitors having nonlinear charging rates. These have not been satisfactory for many applications.

It is accordingly an object of the present invention to remedy the foregoing problem by providing a novel method and apparatus whereby the charging rate of a capacitor can be compensated for nonlinearities between the frequency of the pulses generated by the transducer and the condition sensed through the use of tuned circuits.

Another object of the present invention is to provide a novel circuit which may be easily adapted to compensate for the nonlinearities in frequency response of various transducers over the entire effective range of frequency response by including tuned circuits that have both their resonant frequency and the shape of the impedance-frequency curve adjusted to provide the desired correction.

Still another object is to provide a novel circuit in which the amplitude of constant width pulses from a condition responsve transducer is modified in a tuned circuit to compensate for nonlinearities in the frequency output of the transducer.

THE DRAWINGS

Figure 1:
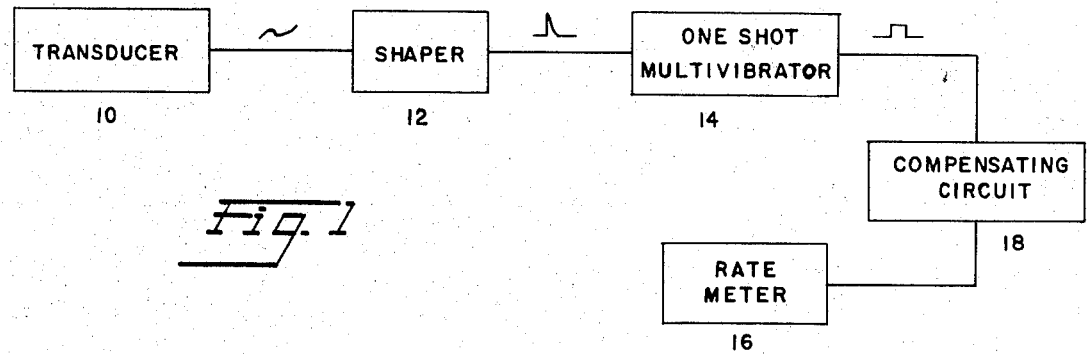
Figure 2:
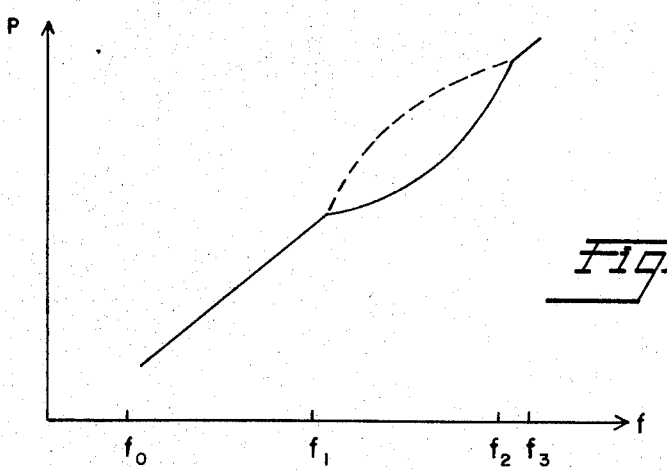
Figure 3:
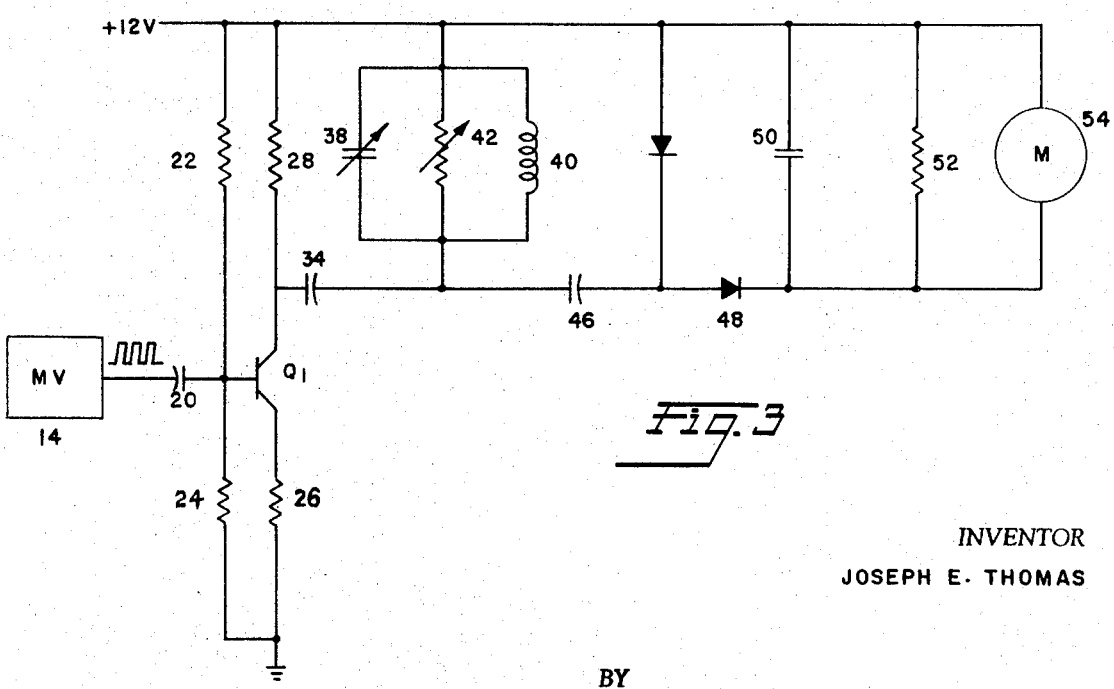

FIG. 1 is a functional block diagram of a system incorporating the present invention;

FIG. 2 shows by the solid line a plot of a physical condition such as pressure versus the frequency output of a typical pressure sensitive transducer and by the dotted line the compensation provided by the tuned circuit of the present invention desired to produce a net linear voltage output to a rate meter; and FIG. 3 is a schematic diagram of the circuit of a preferred embodiment of the present invention.

THE PREFERRED EMBODIMENT

FIG. 1 illustrates a functional block diagram of a system embodying the present invention. A transducer 10 is adapted to detect a physical condition such as temperature, pressure, density, dielectric constant or the like and to produce an output signal which may be the form of a sine wave. This sine wave signal is applied to a shaper 12 and thereafter is used to trigger a one-shot or monostable multivibrator 14 which produces a pulse of uniform ampltiude and duration upon the application of each triggering pulse from shaper 12. The use of a shaper 12 is, of course, unnecessary where the output of the transducer 10 has a wave form which will satisfactorily perform the triggering of multivibrator 14.

In prior art systems of this type, e.g., U.S. Pat. No. 3,248,942 of May 3, 1966, the output signal from multivibrator 14 is applied directly to a rate meter 16 which contains a storage or integrating capacitor for producing an average voltage proportional to the frequency of the output pulses from multivibrator 14. Any nonlinearity of the frequency response of the transducer to the condition being sensed thereby is reflected in the signal applied to rate meter 16.

Referring to FIG. 2, the solid line represents a plot of the pressure versus frequency output of a typical pressure sensitive transducer over the operating frequency range $f_0$ to $f_3$, the nonlinearity in the response curve being shown between frequencies $f_1$ and $f_2$. Rectifying and integrating the output of the transducer will produce a similar plot of pressure versus the response of the potential at meter 16 since the circuit is customarily designed to maintain a linear relationship between the frequency response and the voltage at meter 16. The nonlinearity of the transducer output in the frequency range $f_1$ and $f_2$ thus introduces errors in the potential which appears across the integrating capacitor in the rate meter 16 of FIG. 1.

By way of example, a transducer having a characteristic similar to that illustrated in FIG. 2 is the Halliburton Company's 2" capacitance probe identified as Part No. 458.20333.

Rather than resorting to the intricate, often expensive and sometimes unsuccessful attempts of the prior art to directly adjust the frequency output of the transducer, the present invention provides a circuit to introduce a nonlinearity that may be adjusted to be equal and opposite to the nonlinearity appearing at the output of the transducer. This compensation is achieved by means of a resonant circuit which can be made to affect the appropriate portion of the frequency response curve, i.e., from $f_1$ to $f_2$, prior to the rectification and integrating steps shown in FIG. 1. This desired compensation appears as a dotted line in FIG. 2.

Referring now to the schematic diagram of FIG. 3, the variable frequency, positive going, uniform amplitude and width pulses from one shot multivibrator 14 are fed across coupling capacitor 20 to the base electrode of PNP transistor Q1. Resistors 22, 24, 26 and 28 provide appropriate biasing for transistor Q1, resistor 28 additionally serving as the load resistor with the output of transistor Q1 being taken from terminal 30 at the collector electrode.

The output signal taken from terminal 30 is applied through coupling capacitor 34 across resonant circuit 36. Resonant circuit or filter 36 comprises resonant frequency adjusting variable capacitor 38 and inductance 40 in parallel with a Q adjusting variable resistor 42.

The output of the filter 36 is applied through a coupling capacitor 38 and a half wave rectifying diode 48 where it is integrated by capacitor 50. The potential which appears across gain adjusting potentiometer 52, i.e., the potential of capacitor 50, is sensed and indicated by meter 54.

The frequency of recurrence rate of the constant width, constant amplitude pulse output of monostable multivibrator 14 will vary the charging current and thus the potential appearing across capacitor 50. The pulses applied to the base electrode of transistor Q1 cause the transistor to switch to its high impedance state for the duration of each positive pulse. The output of transistor Q1 as taken from terminal 30 is thus a series of constant amplitude, constant width pulses whose frequency of repetition coincides with that of the signal taken from transducer 10.

As is well known, the resonant frequency of a parallel LC circuit may be varied by varying the reactance of either one of the reactance elements. In the illustrated embodiment, capacitor 38 is variable. The Q or shape of the impedance vs. frequency curve of a parallel LC filter or tuned circuit may also be changed by varying the resistance in the circuit. To this end, a variable resistor 42 is provided. By the selective adjustment of resistor 42 and capacitor 38, the amplitude of the signal applied through capacitor 46 at a particular frequency may be controlled.

This signal is rectified by diode 48 and integrated across capacitor 50. The resistance of gain controlling potentiometer 52 may be varied so as to provide for the adjustment of the rate of discharge of the capacitor 50.

By way of example, a transducer having a frequency response range of 750 to 1000 kilohertz corresponding to frequencies $f_0$ and $f_3$ of FIG. 2 has been utilized with a multivibrator having a maximum pulse width of slightly less than 1 microsecond in a tuned circuit in which the values of the elements are as follows:

capacitor 38—33.8 to 56 picofarads
  inductor 40—150 microhenrys
  resistor 42—15K ohms While the present invention has been explained in the embodiment of a parallel RLC circuit, it to be understood that a series resonant circuit may be used with equal facility in conjunction with a current rather than a voltage source. The present invention is further applicable to correct for multiple nonlinearities; in fact, any nonlinearity in which a compensating response can be generated by the use of one or more filters which may be tuned to resonate at a frequency outside the operating range of the transducer. The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of correcting for nonlinearity of a D.C. output signal representative of a varying condition comprising:
    generating an A.C. signal having a frequency which varies in a nonlinear manner with changes of said condition; converting said A.C. signal into a train of pulses which have uniform amplitude and width; and supplying said pulse train to a circuit for converting said pulse train into a D.C. signal having an amplitude proportional to the frequency of the pulses in said pulse train through a resonant circuit, said resonant circuit introducing a nonlinearity in the output signal to compensate for the nonlinearity in said A.C. signal generator.

2. The method of claim 1 wherein said resonant circuit introduces said nonlinearity by presenting an impedance to said pulses which is determined by the frequency of the pulses and the frequency to which the filter is tuned.

3. A compensating circuit to correct for nonlinearity in the frequency response of a condition responsive transducer comprising:
    a source of pulses of uniform amplitude and duration having a repetition rate which varies nonlinearly with a variable condition;
    an integrating circuit including a capacitor for producing a D.C. voltage proportional to an input signal; and
    circuit means including a filter for connecting the output of said pulse source to the input of said integrating circuit, said filter being effective to introduce selective attenuation in the pulse amplitude depending upon the pulse repetition rate to thereby compensate for the nonlinearity in the frequency response of said transducer.

4. The circuit of claim 3 wherein said filter is a tuned circuit that is adjustable in resonant frequency.

5. The circuit of claim 4 wherein said tuned circuit is a parallel LC circuit.

6. The circuit of claim 5 wherein the tuned circuit contains a variable resistor connected in parallel with the LC circuit.

7. The circuit of claim 3 wherein said pulse source includes:
    a transducer having an A.C. signal output, the frequency of which is responsive to a condition, and
    means including a waveform shaper for connecting the A.C. signal output to the input of said pulse source.

8. The circuit of claim 7 wherein said pulse source comprises a monostable multivibrator and a current amplifier for producing said pulses of uniform amplitude and duration across a resistor connected between a point of fixed potential and one terminal of said current amplifier, and wherein said filter is a tuned circuit connected in parallel with said resistor.

9. The circuit of claim 8 wherein said tuned circuit is a parallel RLC circuit adjustable in Q and in resonant frequency.

References Cited
UNITED STATES PATENTS 3,248,942  5/1966  Cole _____ 73—32X
2,904,681  9/1959  Jones _____ 324—70X DONALD D. FORRER, Primary Examiner J. D. FREW, Assistant Examiner U.S. Cl. X.R.

307—308; 328—1, 167, 165